United States Patent

Dutcher et al.

Patent Number: 6,065,054
Date of Patent: May 16, 2000

[54] MANAGING A DYNAMICALLY-CREATED USER ACCOUNT IN A CLIENT FOLLOWING AUTHENTICATION FROM A NON-NATIVE SERVER DOMAIN

[75] Inventors: David Paul Dutcher; Scott Alan Lenharth; Stanley Alan Smith, all of Austin, Tex.

[73] Assignee: International Business Machines Corporation, Armonk, N.Y.

[21] Appl. No.: 08/888,415

[22] Filed: Jul. 7, 1997

[51] Int. Cl.$^7$ ...................................................... G06F 13/00
[52] U.S. Cl. ......................... 709/226; 709/203; 709/225
[58] Field of Search ............................... 395/188.01, 186, 395/200.33, 200.47, 200.49, 200.55, 200.57; 709/203, 226, 225

[56] References Cited

U.S. PATENT DOCUMENTS 5,421,011  5/1995  Camillone et al. .
5,748,890  5/1998  Goldberg et al. ................... 395/188.01

OTHER PUBLICATIONS

Guski and Lin, "Partial Containment Structure for Inegration of Distributed Computing Environment and Local Registries," IBM Technical Disclosure Bulletin, Sep. 1995, vol. 38, No. 9, pp. 535–538.

Lin, "Extended Registry Object Support for Distributed Computing Environment," IBM Technical Disclosure Bulletin, Sep. 1995, vol. 38, No. 9, pp. 411–413.

Langford, "Mechanism For Supporting Multiple Authentication Servers," IBM Technical Disclosure Bulletin, Mar. 1992, vol. 34, No. 10B, pp. 200–201.

Camillone, Gardner, Rother, and Steves, "Object–Oriented User Administration," IBM Technical Disclosure Bulletin, May 1992, vol. 34, No. 12, pp. 461–465.

Primary Examiner—Zarni Maung
Assistant Examiner—William D. Thomson
Attorney, Agent, or Firm—Jeffrey S. LaBaw; David H. Judson

[57] ABSTRACT

A method of managing a Windows NT user account at a Windows NT client begins following authentication of a user against a non-native server domain by establishing a Windows NT user account at the client. The Windows NT user account is maintained as work is done at the client by the user. At user logoff, the user account is maintained, disabled or deleted based on policy set on the client by an administrator.

21 Claims, 6 Drawing Sheets

MANAGING A DYNAMICALLY-CREATED USER ACCOUNT IN A CLIENT FOLLOWING AUTHENTICATION FROM A NON-NATIVE SERVER DOMAIN

This application is related to co-pending U.S. patent application Ser. No. 08/888,726, which is assigned to the assignee of this application.

BACKGROUND OF THE INVENTION

1. Technical Field

The present invention relates generally to computer networks and more particularly to authenticating a user of a client machine running a native operating system against a user account held at a non-native server domain.

2. Description of the Related Art

The client-server model of computing is a well-known environment. In the model, the user of a computer utilizes a "client" system. The client system runs any of a number of computer operating systems to manage the basic functions that users execute (such as accessing files, executing programs, system administration and the like) as well as to serve as the base against which programs are written. Well-known client operating systems include Microsoft Windows 3.1, Windows for Workgroups, Windows 95, IBM® OS/2® Warp, Apple Macintosh, DOS, many variations of UNIX, and Microsoft Windows NT. The client system serves as the user's workstation, and it may execute programs as well as store some user data.

The server system can also run any of a number of computer operating systems. Well-known server operating systems include Novell Netware, IBM OS/2 Warp Server, IBM AS/400®, Microsoft Windows NT, and many variations of OSF UNIX. The server system is accessed by the client system for specific functions. The functions include, but are not limited to, storage and retrieval of data, storage and execution of applications, and storage of and access to user information.

Industry standards have been developed (for critical and common functions) to aid in the access from different types of client systems to different types of server systems. The use of these standards on the client and server afford users the opportunity to carry out functions in a consistent manner on a variety of common client and server operating systems. One of the activities that has been standardized is the "authentication" of users. Authentication refers to the process in which a user is validated as being able to complete a logon and/or access a system. Standard protocols have been defined within the X/Open Server Message Block (SMB) specification and the open Systems Foundation (OSF) Distributed Computing Environment (DCE) specification.

While many products and operating systems have been developed that utilize the standard protocols, not all products have used the standards. When this occurs, either additional work must be done by the other operating system to implement the unique commands used by a vendor, or access to the other new system and/or product is not allowed if the unique commands are not made available to other vendors. When the commands and/or protocol are not made available, that aspect of the system and/or product is sometimes characterized as being "closed".

The Microsoft Windows NT operating system is becoming a dominant client system in many enterprise computer networks. Because of the "closed" nature of Windows NT, a user of a client machine running this operating system may only log on against an account held at the machine, at a server running the Windows NT operating system, or at any other servers that are "trusted" by the NT server that the client is configured against. Only these options are supplied to the user during the logon process, and there are presently no documented interfaces to allow user authentication from non-native server domains. Moreover, in known Windows NT systems, a local NT user account is required for logon and subsequent user actions. Thus, the NT user account required for initial authentication may exist only on an NT client or in an NT server domain. This closed architecture eliminates the ability to do full centralized administration from a source other than an NT server environment, and there is open capability to create a necessary user account based on information received from a user account provider other than Windows NT.

If primary authentication of a Windows NT client at a source other than a Windows NT server is to be achieved, there must be an associated mechanism for dynamic creation of local NT user accounts as well as a mechanism for dynamic assignment of user privileges for these accounts. Once such accounts are created, there must be an attendant capability to allow administrators to set policy to manage them.

The present invention solves this latter problem.

SUMMARY OF THE INVENTION

It is a primary object of this invention to dynamically create and manage a user account following authentication of a user against an account held at a non-native server domain.

It is another primary object of this invention to dynamically assign and manage user privileges to a user at a client machine following the user's authentication against an account stored at a non-native server domain.

It is a further important object of the present invention to dynamically create a local user account after successful authentication at a security provider's centralized user account storage and then manage that account through user logoff. The technique enables the assignment and maintenance of privileges to the local user accounts.

Yet another important object of this invention is to retrieve group and user permissions from security providers operating non-native server domains and to use that information to dynamically assign user privileges to a client user.

It is a more general object of this invention to facilitate primary authentication of a user of a client running a native operating system at a source other than a native server domain.

It is a more particular object of this invention to authenticate a Windows NT user at an SMB server domain and then to create, maintain and manage a Windows NT user account for that user.

It is another more particular object of this invention to authenticate a Windows NT user at a DCE Cell and then to create, maintain and manage a Windows NT user account for that user.

According to the invention, a user is authenticated at a client machine running a native operating system. Authentication may be effected from one or more non-native server domains including, without limitation, a Server Message Block (SMB) server domain, a DCE Cell, or some other non-Windows NT server domain. The various non-native server domains are "discovered" by issuing requests from the client to one or more of the servers in the network. Following successful authentication, a user account is dynamically established at the client by retrieving from the server user information and a set of "group" privileges associated with the authenticated user. A local representation of these privileges is then dynamically created on the client, after which the privileges are linked to the user account to make the user a member of the local representation. In this manner, the group information is saved on the local machine and the authenticated user is afforded appropriate access rights to the client and the server. Thereafter, a user profile supported on the non-native server domain is retrieved and established on the client. The profile generally includes the user's desktop definition (e.g., colors, patterns, accessibility options, desktop objects) and user information specific to different applications that the user executes.

After the user completes his or her work at the desktop and logs off, the present invention provides for management of the "user account" that was dynamically established at logon. In particular, the system administrator is provided with a mechanism to configure a management policy for the system. The policy allows for the retention of the dynamically-created user account, disabling of the user account at logoff to prevent a user from doing a local authentication to that Windows NT machine, and deletion of the user at logoff time. Other policies may be implemented as well as determined by the administrator.

The foregoing has outlined some of the more pertinent objects and features of the present invention. These objects should be construed to be merely illustrative of some of the more prominent features and applications of the invention. Many other beneficial results can be attained by applying the disclosed invention in a different manner or modifying the invention as will be described. Accordingly, other objects and a fuller understanding of the invention may be had by referring to the following Detailed Description of the Preferred Embodiment.

BRIEF DESCRIPTION OF THE DRAWINGS

For a more complete understanding of the present invention and the advantages thereof, reference should be made to the following Detailed Description taken in connection with the accompanying drawings in which.

DETAILED DESCRIPTION OF THE PREFERRED EMBODIMENT

Figure 1:
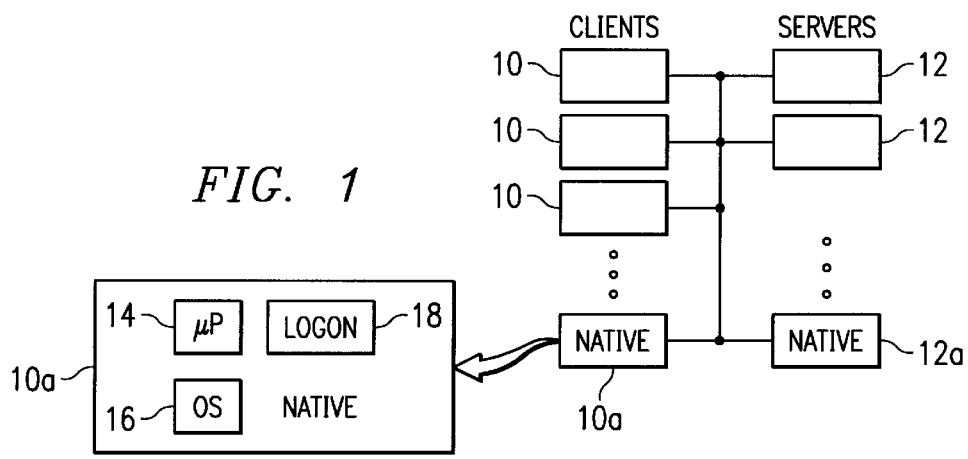
FIG. 1 is a block diagram of a representative computer network in which the present invention is implemented.

FIG. 1 illustrates a computer network having one or more "client" machines 10 and one or more "servers" 12. A typical client machine 10a is a personal computer or workstation running an Intel processor 14 and the Microsoft Windows NT 4.0 operating system 16. For convenience herein, a machine configured in this manner is sometimes referred to as a "Windows NT client". Any other type of hardware platform that runs Windows NT operating system may be used as the client. According to the present invention, the client also includes an application 18, sometimes referred to herein as a "Primary Logon Client," which provides certain additional functionality to achieve the objects of the present invention. Each client has basic networking hardware to establish a connection out to a server. Thus, for example, a client may have a TCP/IP or NETBIOS connection to the network running over a token ring or Ethernet adapter.

Typically, a server in the computer network is another personal computer or workstation platform that is Intel-, PowerPC®- or RISC®-based, and includes an operating system such as Windows NT 4.0, IBM® OS/2® Warp Server, AIX® or the like. At least one server 12a in the computer network supports the Microsoft Windows NT 4.0 platform. For convenience, this platform is sometimes referred to as a "Windows NT server". When a user seeks to be authenticated to server 12a from a Windows NT client, i.e. a client machine running the Microsoft Windows NT operating system, the server 12a is said to be "native" since it is running the same operating system as the client. A "non-native" server is thus a server platform (e.g., a personal computer) running an operating system that is different than the operating system running on the client system accessing the server. Given a Windows NT client, examples of such servers include, without limitation, IBM® OS/2 Warp Server, IBM LAN Server®, other types of Server Message Block (SMB) servers, as well as operating systems that run Open Systems Foundation (OSF) Distributed Computing Environment (DCE) software. An example of the latter is a DCE Cell running Distributed File System (DFS).

Figure 2:
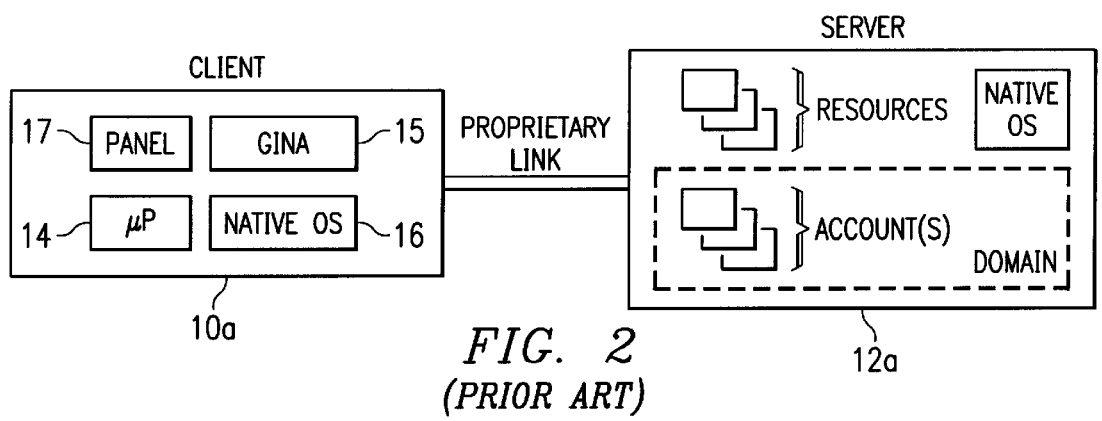
FIG. 2 is a block diagram of a known "Prior Art" technique wherein a user of a Windows NT client machine is authenticated against an account held at a Windows NT server domain.

In the prior art, a user of a Windows NT client 10a is typically authenticated by a Windows NT server 12a as shown in FIG. 2. This proprietary client-server linkage is created by the fact that both the client and server run the same operating system (e.g., Microsoft Windows NT 4.0)

and use an undocumented set of interfaces for the function of user authentication. In this known technique, a user seeking to be authenticated at the client simultaneously presses the "control", "alt" and "delete" keys of the keyboard to initiate a logon session. This action calls a "graphical identification and authorization" module 15 (sometimes referred to as "gina") that controls the logon sequence. This module displays a logon panel display box 17 to the user and prompts for entry of a userid and password. In a known embodiment, the logon panel typically enables the user to logon against an account held at the client machine itself, or to logon against an account held at the NT server. The gina module 15 controls what servers show up in the logon panel dialog box 18. In particular, when the NT client is installed in the network, the system administrator can point the workstation against an NT domain name, and that domain name then shows up as an authentication option. In addition, the administrator of the NT server may configure the server so "trusted" authentication domains are displayed.

In this known technique, the gina module 15 tightly controls the locations that are available for authentication to include the local NT workstation itself, the remote NT server 12a, and any other servers that are "trusted" by the NT server that the client is configured against. Generally, only these options are shown to the user seeking authentication, and there are no interfaces available to enable the user to be authenticated from non-native server domains. The present invention addresses this problem.

Figure 3:
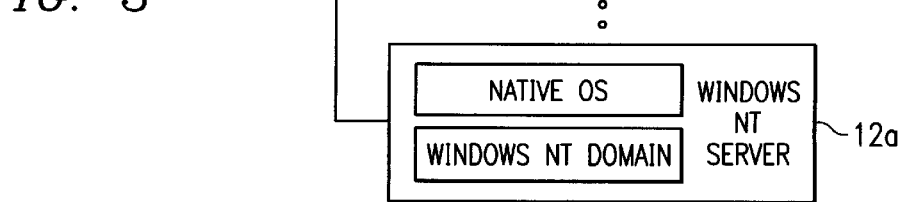
FIG. 3 is a block diagram of the present invention wherein a logon mechanism is provided in the client running a native operating system to facilitate authentication of a user of the client machine against an account held at a native or non-native server domain.

In particular, and as seen in FIG. 3, a new gina module 15' is registered instead of the gina module 15. This enables the Windows NT client user to be authenticated against an account held at a non-native server domain 19. As used herein, a "non-native server domain" refers to a database of user account information retained at a given server running an operating system that is different than the operating system running at the client system. The term "heterogenous" is commonly used to describe an environment in which the client operating system and server operating system are different. This type of environment is common in the client-server model. In contrast, the term "homogenous" is commonly used to described an environment in which the client operating system and server operating system are the same.

A non-native server domain is typically supported on a non-native server. Thus, where the user seeks authentication from a Windows NT client, a non-native server domain includes, without limitation, any Server Message Block (SMB) server domain (e.g., IBM Warp Server 4.0), a DCE Cell in which Distributed File System (DFS) is implemented, or other known domains such as UNIX domains. This is illustrated in FIG. 3. Of course, the computer network can also include a Windows NT server domain 12a if authentication is sought from a native server domain.

In the preferred embodiment, the client machine is a Windows NT client, although one of ordinary skill in the art should appreciate that teachings of this invention are also applicable whenever the client machine is running a native operating system and there is a desire to authenticate a user against an account held at either a native or non-native server domain. Some of the features of the present invention (e.g., the "discovery" function as described in FIG. 6) are implemented even when the client-server paradigm remains homogeneous.

Thus, according to a primary goal of the present invention, the homogeneous NT client-server environment is uncoupled so that a user of a Windows NT client (by way of example only) may be authenticated by a non-native server. With respect to authentication of the Windows NT client, the client-server environment is "heterogenous." Authentication at the client gives the user access to resources on the client system, and when this is done via an account definition held at a server, it also gives the user access to resources at the server network via a single logon. The present invention thus enables a user to select a particular location against which he or she desires to be authenticated. Thus, the user's account information may be retained at the non-native server domain in addition to (or instead of) the Windows NT server normally coupled to the Windows NT client in a closed manner. The user's single userid and password are then held out at a non-native server, such as a Warp Server, a DCE cell, or the like. This information may also be retained at a native server domain.

Figure 4:
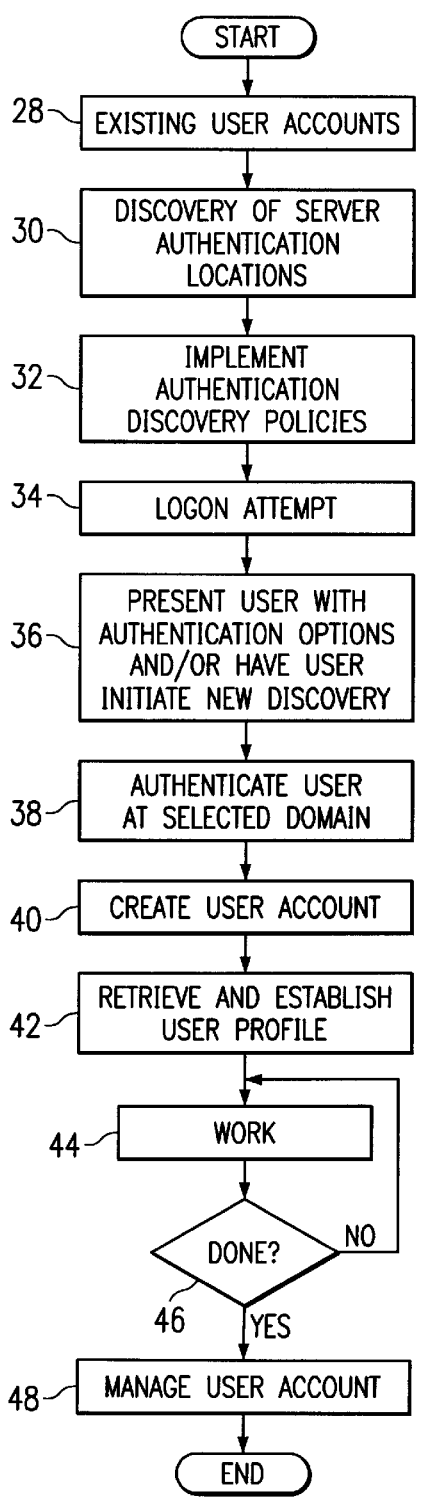
FIG. 4 is a flowchart of a preferred method of the present invention to enable a user of a Windows NT account to be authenticated against an account held at a native or non-native server domain.

FIG. 4 is a flowchart representing various "high level" operations of the present invention. The method begins at step 28, which signifies the existence of a account on selected server domain systems in the computer network. AS used herein, a user account typically includes, but is not limited to, a user identification (userid), a password for the userid, and some representation of privileges for the user. At step 30, server locations at which a user may be authenticated are "discovered" using a discovery mechanism of the invention. This mechanism is described in detail below. At step 32, the administrator may manage or control authentication discovery policies that are later provided to a user seeking authentication. Steps 28, 30 and 32, being administrative in nature, generally occur before a given user seeks to logon against a user account maintained in the system, although step 30 may be performed by a user from the logon screen itself during the authentication process. At step 34, it is assumed that a user seeks to logon against an account associated with that user and held at a given server in the network. This begins the logon processing. At step 36, the user is presented with the names and locations of the server domains available for authentication, or the user may initiate his or her own "discovery" of such information (if that capability is enabled).

Following selection of a domain, the user is then authenticated at step 38. Such authentication may be at a native or non-native server according to the present invention. Typically, this authentication is a process in which the userid and password are provided to a user account database for validation. Upon successful validation, a positive confirmation is received for the authentication and the user processing is allowed to continue. Thereafter, at step 40, when authentication is at a non-native server, a "local" user account is created dynamically (or, alternatively, updated if the user account already exists) at the client machine. This is a Windows NT account in the preferred embodiment. At step 42, the NT user profile is retrieved and established at the client to enable the user to initialize a personal "desktop" and to implement certain access "preferences" at the client. The "user profile" (which normally differs from the "user account" described above) thus preferably includes, without limitation, a desktop definition and a set of preferences for the user. A user profile is created as the user changes appearance and preferences while using the client. Thus, for example, the display screen format is accessed and altered through known techniques (e.g., the Windows '95 desktop "Preferences").

Returning back to the flowchart, the user then proceeds to do work at the client machine. This is step 44 in the flowchart. When the user is done at the NT client (typically, but not necessarily, at logoff), as indicated by a positive outcome of the test at step 46, the NT user account is then "managed" at step 48 by policy established by the administrator. Such management typically involves maintaining, deleting or disabling the dynamically-created local NT user account, although other operations may also be carried out. This completes the high level processing.

Figure 5:
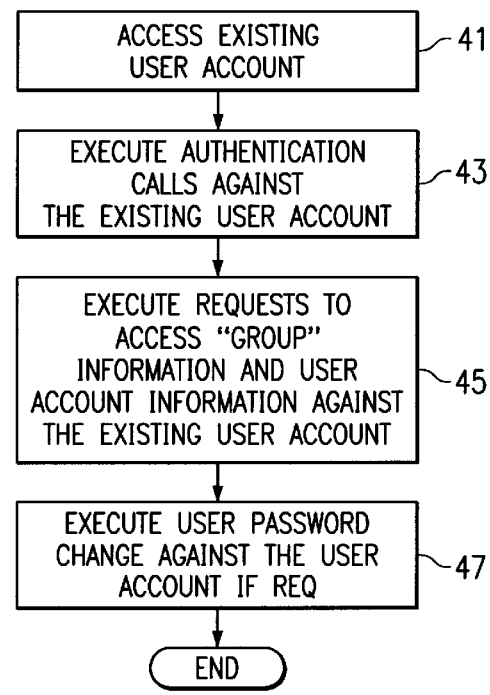
FIG. 5 is a flowchart of a preferred routine for accessing user account information on a server domain.

FIG. 5 is a simplified flowchart illustrating how a user account is accessed in a given server domain. For illustrative purposes, it is assumed that the server domain is non-native such that a user of the Windows NT client machine may be authenticated against the account held at a non-native server domain. The non-native server domain is assumed to be any Server Message Block (SMB) server, such as IBM warp Server 4.0 or a DCE Cell (such as OSF DCE running DFS), or any other type of non-native server that implements the appropriate commands.

There are many mechanisms for creation of user accounts on different types of non-native server domains. This invention allows usage of these existing accounts such that no unique actions (e.g., changing of the user account or creation of a new user account) are required on the non-native server domain. By using existing authentication requests and requests to retrieve user account information from the non-native server, support has been extended to SMB server domains, DCE Cells, and other non-native servers.

Figure 8:
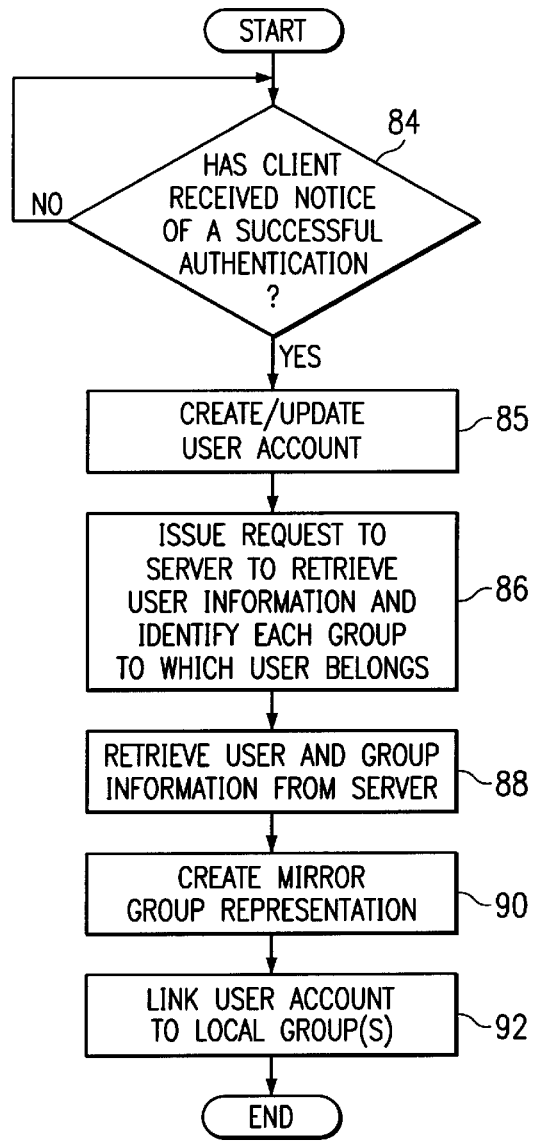
FIG. 8 is a flowchart illustrating how a user account is established dynamically following authentication of the user.

The routine illustrating how the user account is accessed from a client system begins at step 41 with the user account on the non-native server having been previously created. At step 43, and as illustrated below, representative authentication calls are executed against the existing user account. The routine then continues at step 45, wherein existing requests to access user account information and "group" information are executed against the existing user account. FIG. 8 describes this process in more detail. Finally, at step 47, a user password change is optionally executed against the user account on the non-native server domain. This allows for these password changes from a native client to a non-native server domain.

Figure 6:
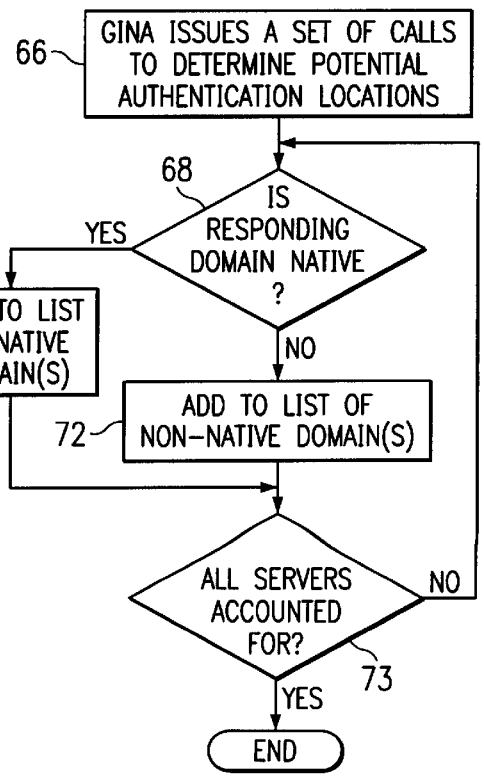
FIG. 6 is a flowchart of a preferred routine for discovery of authentication locations according to the present invention.

FIG. 6 is a high level flowchart illustrating the operation of the discovery mechanism of the present invention. Further implementation details are set forth below. Preferably, this mechanism is resident on the client machine and functions to compile unique "lists" of native and non-native authentication locations from which the user may be authenticated. The discovery mechanism is very advantageous given the inherent limitations in how potential authentication locations are determined in the priorart. Preferably, the discovery mechanism includes documented "interfaces" to which third party authentication service providers may implement to enable the discovery and storage of discovered locations on the client system. The discovery routine may be activated by an administrator when the system is first installed or during system configuration (or re-configuration), or it may be activated by a user during the logon process itself. The routine begins at step 66 (either from an administrative interface or the logon screen) with the gina module 15' controlling issuance of a set of calls to servers on the network to determine potential authentication locations. The routine continues with the test at step 68 to determine whether a particular server domain responding to a call is native. If the outcome of the test at step 68 is positive, the routine continues at step 70 to add the domain to a list of native server domains maintained at the client machine. If the outcome of the test at step 68 is negative, indicating that the server domain is non-native, the routine continues at step 72 to add the non-native server to the appropriate list of non-native server domains maintained at the client. A test is then done at step 73 to determine if all servers have been accounted for during the compilation. If not, the routine cycles back. If the outcome of the test at step 73 is positive, however, the discovery process is complete.

In the preferred embodiment, the client runs Windows NT and the discovery mechanism is used to discover non-native servers including, without limitation, SMB domains such as IBM Warp Server, IBM LAN Server, domains running on the AIX® operating system, and the like. Alternatively, the discovery mechanism is implemented in the native environment and thus is used to discover other Windows NT domains. This latter implementation is especially advantageous in Windows NT-based client-server or other such "closed" system because it reduces the time otherwise needed to have administrators individually set up "trust" relationships (as used between individual Windows NT server domains) or equivalent relationships. Thus, in one embodiment, the discovery mechanism is implemented at a client running a native operating system and is used to discover native server domains. In either case, preferably the discovery process offers the administrator an associated "policy" mechanism that enables the administrator to tailor how the user at the client may interact with the discovered authentication information.

Figure 7:
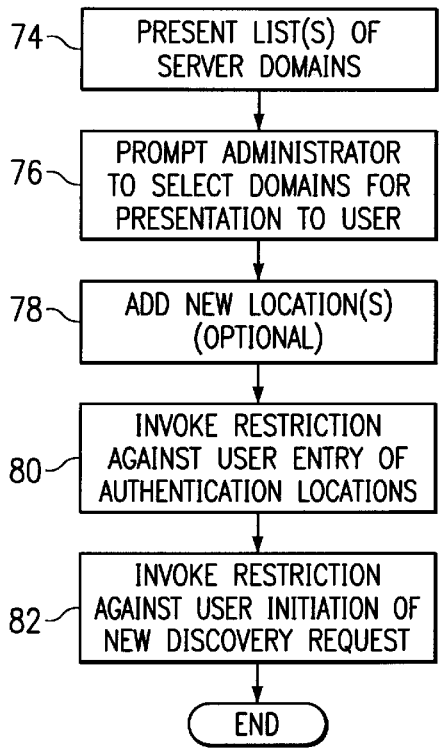
FIG. 7 is a flowchart illustrating how an administrator may manage discovery policy at the client following the discovery of authentication locations in FIG. 6.

In particular, once the list of server domains is discovered, the administrator (i.e. during installation or configuration) may manage the list of native and non-native server domains (as well as other functions) in order to control the user's authentication options. This is step 32 in the flowchart of FIG. 4, and this step preferably takes place at the client machine from which users will later seek to be authenticated. FIG. 7 illustrates this process in the preferred embodiment.

In particular, at step 74, the one or more lists of server domains (which may be just one list with two parts) discovered are presented to the administrator. The administrator is then prompted at step 76 to select the domains that will be presented to a given user seeking to be authenticated when a logon is initiated. Thus, step 76 enables the administrator to remove particular authentication locations from the set of locations that can be viewed by the user on the logon panel. If desired, the administrator may also enter the name of an authentication location and have it presented to the user on the logon panel as an additional authentication location. This operation is represented at step 78 in FIG. 7. In this manner, the administrator may add a particular authentication location of which he or she is aware but that is not "discovered" during the discovery process for whatever reason. At step 80, the administrator is prompted to determine whether users of the client machine are to be restricted from entering their own authentication locations at that particular client machine. Step 80 thus determines whether users are to be limited to selecting one of the locations discovered and presented at the logon screen. At step 82, the administrator selects whether users of the client machine are able to initiate a request to cause a new discovery of authentication locations to be executed from the logon panel. This completes the management process.

Thus, according to the present invention, once authentication locations are discovered, these locations may be managed for presentation to the users seeking authentication at the client. This information is preferably presented to the user via a logon display screen or panel with preferably three (3) or more fields: a user name field, a password field, and a "from" dialog box in which the user enters the location at which he or she desires to be authenticated. The display screen or panel also preferably includes a "Discover" button (if the mechanism has been enabled by the administrator in step 82 in FIG. 7) to enable the user to effect the discovery process at logon. In addition, the "from" dialog box (or some such other equivalent construct) may include the ability for a user to enter his or her own destination that may not be available from the "from" box (if the mechanism has been enabled by the administrator in step 80).

The policy mechanism provides a tool by which administrators pick and choose the authentication locations from the compiled list of "discovered" native or non-native server locations. This mechanism also allows an administrator to configure whether the user has the capability to type the name of an authentication location into the "from" box or some other user interface element, or to turn off this capability. The policy mechanism also allows the administrator to remove the "Discover" button from the user's logon screen to restrict the user from effecting discovery during the logon process.

The policy mechanism thus allows the administrator to populate an individual client's "from" dialog box, to turn off the user's ability to enter a "custom" authentication location from the logon panel, and/or to turn off (or activate) a "Discover" button that enables the user to effect new discovery.

It is now assumed that the user has selected (or entered his or her own) authentication location. At this point, the application issues an appropriate call (as illustrated below) to the selected server and establishes a connection between the client and the server for authentication. The actual authentication then occurs, preferably at the server domain. Typically, this is achieved by comparing the userid and password passed by the authentication application on the client to the information stored at the server domain. This is step 38 is FIG. 4 and is a known process. The particular authentication mechanism is not part of the present invention.

Turning now to FIG. 8, a flowchart is shown of the next step according to the present invention, namely, the establishment of a user account at the client. This was step 40 in FIG. 4. The user account is dynamically established at the client machine in a format of the native operating system. Thus, in the preferred embodiment, a Windows NT user account is established at the client machine after authentication (which may be, as noted above, from a non-native server domain). The routine to dynamically create an NT user begins at step 84 to test whether notification of a successful authentication has been received from the server. If the outcome of the test at step 84 is negative, the routine cycles. If, however, the outcome of the test at step 84 is positive, the routine continues to create a new NT user on that machine (or update an existing account) at step 85 and to associate a set of access rights to the new (or updated) user account. To this end, the routine continues at step 86 by issuing a request to the server (at which the client was authenticated) to retrieve unique user information and, further, to identify each group in which the user is a member. Although not meant to be limiting, a particular "group" is merely a collection of users that have defined access rights according to some policy. The group information is a convenient mechanism to define the user's privileges with respect to information available from the server. At step 88, the unique user information and group information associated with the authenticated user is retrieved from the server. At step 90, a representation of the "groups" is set up at the client machine. These local "groups" mirror their counterparts on the server. The routine then continues at step 92 to make the user a member of the local groups. This is achieved by linking the user account to the local group information in a data structure. This completes the processing.

Group privileges are thus obtained from the server. A local representation of these privileges is then dynamically created on the NT client, after which the privileges are linked to the user account to make the user a member of the local representation. In this manner, the group information is saved on the local machine and the authenticated user is afforded appropriate access rights. By having access rights controlled by groups on the client and server, users that are part of the group on the server with common access rights will also have access rights to information stored on the local client.

Figure 9:
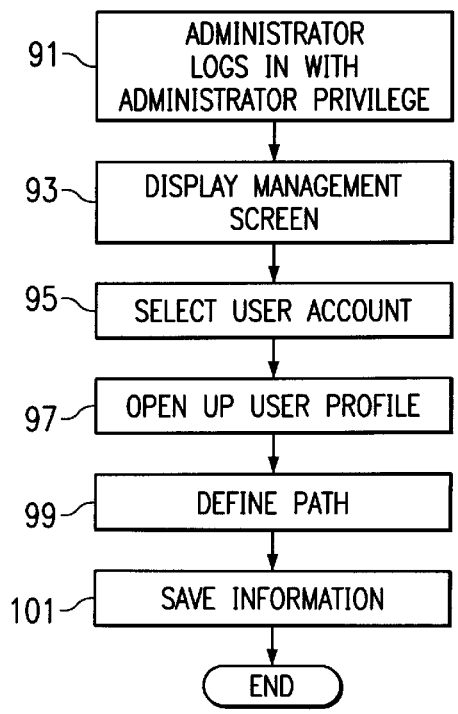
FIG. 9 is a flowchart illustrating a routine for establishing a user profile at the client.

Turning now to FIG. 9, a flowchart is shown of a preferred routine for establishing a user profile at the client machine. This was step 42 in FIG. 4. By way of brief background, a "user profile" may be thought of as a collection of information that defines how a given user desires to view his or her relationship with the client machine. Thus, for example, the user profile may include the user's desktop representation (which is configurable through standard Windows interfaces) as well as some personal preferences. As part of logon process, it is desirable to provide the user with a personalized desktop and associated preferences so that the user may logon from any machine in the network and have his or her "desktop" the same, irrespective of the particular machine from which the logon is effected. Although the standard Windows NT operating system can store desktops and retrieve them from an NT server, it does not have capability of retrieving a user profile from any other type of server.

The storage of a user profile may have been done previously, and the profile could be stored in a standard location on a non-native server or in a location specified in the user's local NT user account. When the user profile is stored in a standard location on the non-native server, specific commands (as described below) are used in the "Primary Logon Client" (PLC) code to establish the required connection, to access the non-native server standard locations, and to ensure that appropriate files are retrieved from the non-native server. Alternatively, the location of the user profile is uniquely specified for the user account. As described in FIG. 11, a dynamically-created user account can be maintained on the client system. When that is done, a specific path may be entered for the user's user profile.

Referring now to FIG. 9, the storage routine for entering a specific user profile path begins at step 91 with an administrator having administrative privilege logging into the client. At step 93, a user manager screen is displayed for the client. The user account is selected at step 95. At step 97, the administrator selects "profile", which causes a user environment profile dialog window to be displayed. At step 99, the administrator enters a UNC path and file name (e.g., \\WarpServer\ShareName\ProfileDir) where "WarpServer" is the name of the server, "ShareName" is the share name, and "ProfileDir" is the location where the user profile is to be loaded during logon and saved at logonff. At step 101, the administrator saves the information and then closes the manager program.

Figure 10:
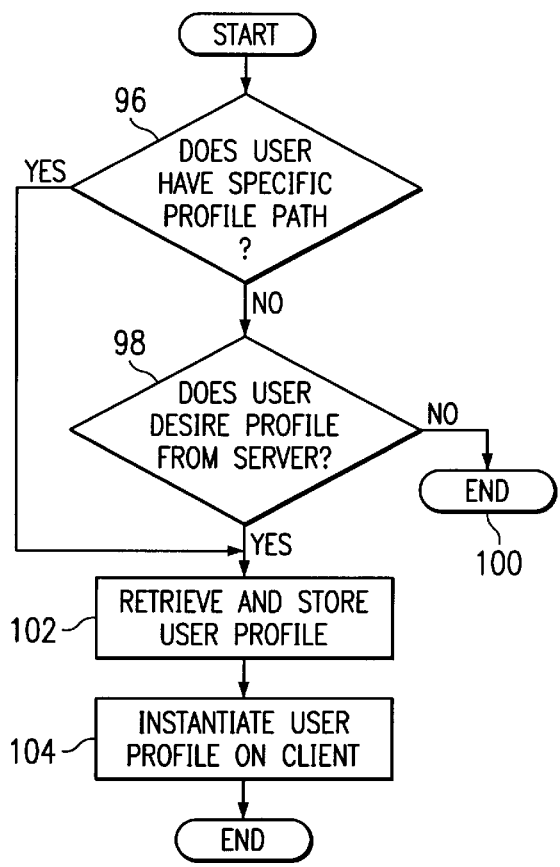
FIG. 10 is a flowchart illustrating a preferred technique for establishing a user profile at the client machine.

Turning now to FIG. 10. the routine for retrieving the user profile is now described. It is assumed that there are a series of files and directories that makes up a user profile. The routine begins at step 96. A check is made to determine whether a specific profile path was entered as described in FIG. 9. If so, the routine proceeds to step 102. At step 98, a test is made to determine whether the user has a user profile he or she wishes to obtain from the server. If the outcome of the test at step 98 is negative, the routine branches to step 100 and uses a default user profile. If, however, the outcome of the test at step 98 is positive, the routine continues at step 102 to retrieve and utilize the user profile. At step 104, the user profile for the authenticated user is instantiated on the client. This completes the processing.

Figure 11:
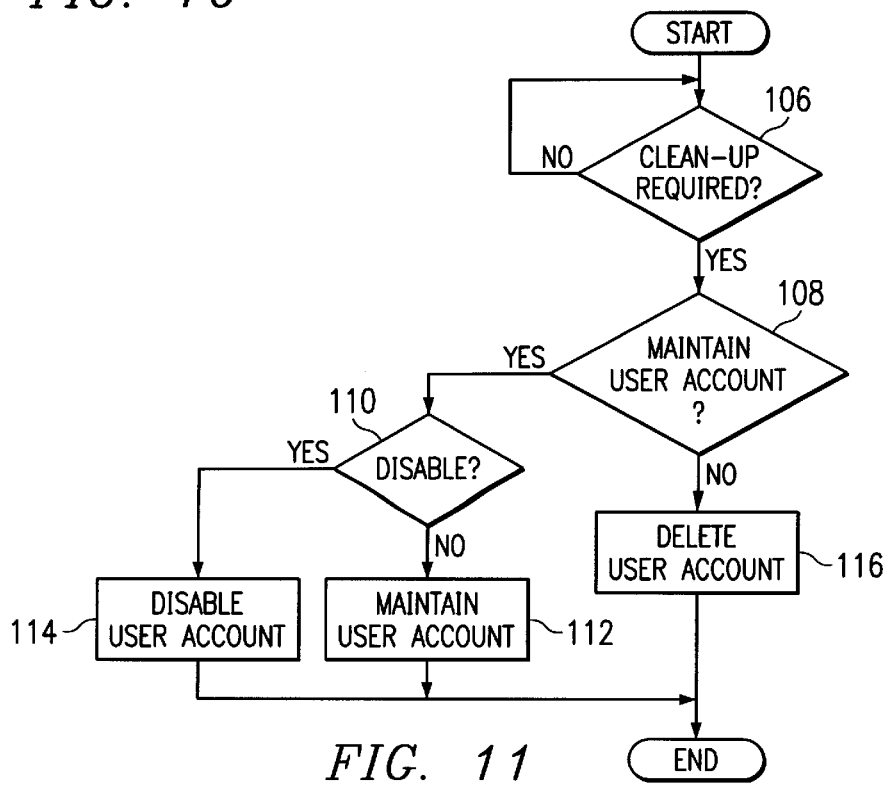
FIG. 11 is a flowchart illustrating a "maintenance" routine according to the present invention.

It is now assumed that the user has logged on, has been authenticated, has established a user account, downloaded his or her user profile, and performed some work on the client. When the user logs off, it is desirable to "clean up" the client system for one or more reasons. Thus, for example, the user may have only used the machine for a short task and intends to return to his or her normal workstation on the next day. Or, the user may have logged on from his or her "own" machine but may have modified his or her respective user profile. Or, the user may have added or deleted one or more authentication locations. Thus, the present invention provides a mechanism by which a client machine "cleans up" after a particular logon (if desired) by taking some predetermined action with respect to a user account that was dynamically created on the client machine. In particular, and although not meant to be limiting, typically such clean-up involves deleting, disabling or maintaining the user account. This operation is illustrated in FIG. 11.

The routine begins at step 106 to determine whether the user account is to be cleaned up. Step 106 has a positive outcome at logoff, but there may be other occasions when the user is still logged on when it will be desirable to implement the routine. If the outcome of the test at step 106 is negative, the routine cycles. Upon a positive outcome, however, the routine executes a test at step 108 to determine whether the user account should be maintained. If so, a second test is performed at step 110 to determine whether the account should be maintained but disabled. If the outcome of the test at step 110 is negative, the account information is retained on the machine as active at step 112. If the result of the test at step 110 is positive, the account is maintained but disabled at step 114. If, however, the outcome of the test at step 108 is negative, the user account is deleted at step 116 and the routine terminates.

The present invention thus implements "dynamic" local accounts on the client machine. A dynamic local account is a user account that is created on the local Windows NT workstation when a user logs on to a location other than a Windows NT server. AS discussed above, a local account is created after the user is successfully authenticated on the remote logon server. The account gives the user valid security credentials on the local workstation.

The present invention preferably provides three (3) options for managing the dynamically-created user account. The administrator may delete the account when the user logs off. This is the most secure option but only allows users access to local resources based on group membership. This is the default option after installation. The administrator can disable the account when the user logs off. This provides a faster logon and allows the full range of access control to be applied to local resources. Users are restricted to network logons with these accounts. Alternatively, the administrator may keep the account when the user logs off. This is the fastest logon and allows local logon in addition to previously mentioned capabilities.

In a preferred embodiment, the logoff policy must be set on the Windows NT client by a user with administrative privilege. There are preferably three (3) different settings for the policy. After the administrator has logged on to the Windows NT client, the logoff policy is set as follows:
  1) access the REGEDT32 tool on the Windows NT machine;
  2) establish the appropriate account settings with:
    0 Keeps the account.
    1 Deletes the account.
    2 Disables the account.
  3) Save the changes and exit the REGEDT32 tool.

In the preferred embodiment, the maintenance of user accounts occurs as part of the user logging off from the Windows NT client which is a positive outcome at step 106 of FIG. 11. At logoff, the user account is checked to determine if it is to be managed by the invention. This is determined by checking to see if the user is part of the Roaming Users group on the Windows NT client. This was set as part of the dynamic creation of the user account.

If the user account is part of the set of accounts to be managed by the invention, the logoff policy that was set by the administrator is accessed to determine what action should be taken which is step 108. the logoff policy is stored in the registry in the following location:
HKEY_LOCAL_
MACHINE\System\CurrentControlSet\Services\IB MNeTNT\LogoffPolicy
If the policy is set to "maintain (keep) the user account" (as signified by a value of 0 in this embodiment), no action is taken on the user account. The logoff is processed and the user account remains on the client machine. This is step 112.

If the policy is set to "disable the user account" (as signified by a value of 2 in this embodiment), a Win32 API is executed to change the local account status to disabled. The NetuserSetinfo is used to set the user account to a status of disabled. When this is done, the local user account will remain on the client system but it will be marked as disabled. This status will ensure local logons are not done using the account, but the account will remain on the system to be used for future logons using the base invention. This is step 114.

If the policy is set to "delete the user account" (as signified by a value of 1 in this embodiment), a Win32 API is executed to delete the local user account. The NetUserDel is used which will delete the local user account that was created as part of the logon of the user through this invention. The result of this action is that the client machine will not have this user as part of the account database after the logoff completes. This is step 116.

Thus, according to the present invention, a user seeking to authenticate from a client is presented with a logon panel. Authentication locations that have been or are discovered are then listed. The user enters userid and password and then selects where he or she desires to be authenticated against. Depending on the location chosen, the application issues an appropriate logon call that the particular server recognizes.

The present invention offers significant advantages over the prior art when the client is a Microsoft Windows NT client. The invention allows authentication out to any number of non-native servers, as well as authentication from NT domains or the local NT workstation itself. Once a successful authentication takes place, an NT user account is then dynamically created (or updated) at the client. The NT user account allows the authenticated user to obtain the server's resources as well as local resources. Thus, the invention achieves its primary goal of enabling a client running the Windows NT operating system to go to other types of servers besides NT 4.0 servers in order to be authenticated.

One of the preferred implementations of the invention is a client application, namely, a set of instructions (program code) in a code module which may, for example, be resident in the random access memory of the computer. Until required by the computer, the set of instructions may be stored in another computer memory, for example, in a hard disk drive, or in a removable memory such as an optical disk (for eventual use in a CD ROM) or floppy disk (for eventual use in a floppy disk drive), or downloaded via the Internet or other computer network. Thus, the present invention may be implemented as a computer program product for use in a computer. In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps.

The present invention provides other advantages. It is desirable to have a single logon from a Windows NT client to enable access to non-native (e.g., an SMB) server resources from the NT desktop. The user's account defines the non-native server resources including a home directory, logon assignments, network applications and logon scripts. If multiple accounts are required between the client and the server, the logon must be "coordinated." The invention provides a single logon step from the NT client that allows users immediate access to all Windows NT and non-native server resources It is also desirable to have a single user definition for authentication for all authentication (logon) requests. Thus, for example, where Warp Server is used, many existing implementations have OS/2 Warp or LAN Server domains as the centralized location for all user information for OS/2, Windows 3.1, and Windows 95 clients. They need to include management and authentication of Windows NT clients from the same location. The present invention satisfies this requirement by enabling the use of a single user account for all authentication requests. Centralized user administration provides quick and easy user updates. BY having a centralized user account database (domain) on OS/2 Warp Server, for example, the customer can either extend existing client support to incorporate Windows NT clients or implement OS/2 Warp Server as the central system.

Users in heterogenous environments require delivery of additional network resources during user startup processing. Windows NT standard support enables the installation of additional network providers that execute after successful NT authentication. Execution of Windows NT Network Provider support is required for all Windows NT client solutions. The present invention enables users to initiate multiple network (server) connections as part of the logon process.

By supporting "user profiles," the invention provides desktop and environment consistency. Instead of having a single user tied to a single workstation with their own preferences, the users can be "roaming users" that utilize any of a set of workstations. This also supports multiple users being able to get their unique desktops on a single NT client. Further, when the user account is established, the user may become a member of groups having access privileges. These privileges are typically set by system policies that control the functions clients are able to execute. With policies, server administrators can centrally control what users can do on a particular set of servers.

In addition, when users view their desktops, they want to see everything available to them. The invention also addresses this problem. By having the server resources attached as part of a single logon and having the resources displayed in the base Windows NT screens, the user can seamlessly access both client and server functions through common Windows NT desktop objects like My Computer and Network Neighborhood. This "seamless" integration removes the distinction between resources on the server and client. End users find resources more quickly and with less confusion.

A more detailed description of a preferred embodiment of the present invention is now described in the context of a Windows NT implementation. In the following description, the client machine is running a Windows NT operating server, and thus the native operating system on the domain server is Windows NT. As will be seen, several of the functions implemented in the present invention take advantage of existing Windows NT functionality but in a novel way in order to achieve the advantages and objects of the present invention.

Figure 12:
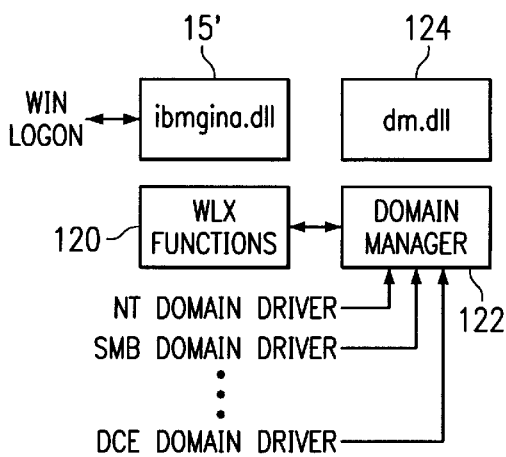
FIG. 12 is a block diagram illustrating a preferred architecture of the present invention.

Referring now to FIG. 12, a block diagram is shown of the preferred architecture of the present invention. gina module 15' (ibmgina.dll) exports a set of functions 120 (also referred to as Wlx* functions) required to support the WinLogon process. This module also controls the visual elements of the interface including displaying the logon panel, collecting the userid and password from the user, displaying messages, etc. To actually perform the work of authentication, the gina module 15' issues calls to the domain manager 122, which is implemented by dm.dll 124. The domain manager 122 provides the framework that support multiple authentication providers (domain drivers) at the same time. It accepts requests from the gina module ibmgina.dll, determines the appropriate domain driver to handle the request, and then routes the request to the domain driver to actually perform the work. The domain manager 122 also manages dynamically-created local accounts when performing a non-native logon so that the user has the proper security context on his or her workstation when logged on to the server. This frees the domain drivers from re-implementing the same function so that they can concentrate on providing code that is unique to the driver.

Domain drivers are responsible for supporting a well-defined set of interfaces that the domain manager calls at the appropriate time. The domain manager 122 preferably has no knowledge about any particular domain driver. Each domain driver registers with the domain driver by adding an entry to a list. The entry contains the name of the module that implements the domain driver interface. At startup, the domain manager 122 enumerates the list of domain drivers, dynamically loads each module, then routes requests to the drivers as appropriate. The domain driver interface contains sufficient routines to allow the domain manager to determine which driver should handle a given request even though the domain manager preferably has no particular knowledge of the actual driver.

The particular details of the above-described operations are now described.

GINA Registration

The Windows NT 4.0 architecture provides for a replaceable gina module. The WinLogon process relies on whatever gina module is to provide a number of predefined services for it (through well-defined interfaces). WinLogon is the standard logon process executing within the Windows NT operating system. WinLogon calls gina for authentication. By default, WinLogon uses the msgina.dll provided with the Windows NT operating system. Thus, as noted above, the present invention first registers the alternative gina module.

To register the alternative gina module, a ginaDLL key is first created in the registry that points to the alternative gina module. The ginaDLL key is preferably created under:

HKEY_LOCAL_MACHINE\Software\Microsoft\Windows NT\CurrentVersion\Winlogon
and has the following format:
  Key: ginaDLL
  Type: REG_SZ
  Value: ibmgina.dll This key is constructed during the install process. It does not take effect until the system is shutdown and rebooted. After reboot, WinLogon uses the newly-registered gina module (ibmgina.dll).

Architecture

The gina module is required to export the following interfaces to support WinLogon:
  WlxInitialize ( ) performs system initialization
  WlxDisplaVSASNotice ( ) secure attention sequence (SAS) puts up logon screen
  WlxLoggedOutSAS ( ) handling SAS when no user is logged on
  WlxLoggedOnSAS ( ) handling SAS when user is logged on
  WixAcivateUserShell ( ) handles display of user screen
  WlxLogoff ( ) handles user logoff
  WlxShutdown ( ) handles user selection of shutdown option
  WlxDisplayLockedNotice ( ) displays the "locked workstation" notice
  WlxWkStaLockedSAS ( ) handles SAS when workstation is locked
  WlxisLogoffok ( ) displays logoff notice
  WlxscreenSaverNotify ( ) handles screen saver display request
  WlxstartApplication ( ) handles application startup at logon The Windows NT operating system issues these Wlx function requests during standard operating system execution and the registered gina module is responsible for handling each of these requests. As discussed generally above with respect to FIG. 12, the ibmgina.dll module exports the Wlxfunctions required to support the WinLogon process and handles the visual elements of the interface. To actually perform the work of authenticating a user, it calls the domain manager, which then makes calls to the various domain drivers (one for each of DCE, NT, SMB and the other supported domains). The domain drivers are the modules that provide a set of common functions used by authentication, discovery, user profile storage and retrieval, logoff, dynamic user account creation, and dynamic user account management.

In particular, the domain drivers are responsible for supporting a well-defined set of interfaces that the domain manager will call at the appropriate time. Each domain driver registers with the domain manager by adding an entry to:
HKEY_LOCAL_MACHINE\System\CurrentControlSet\Services\IBMNeTNT\DomainDrivers The entry contains the name of the module that implements the domain driver interface. At startup, the domain manager enumerates the list of domain drivers, dynamically loads each module, then routes requests to the drivers as appropriate. The domain driver interface contains sufficient routines to allow the domain manager to determine which driver should handle a given request even though the domain manager has no particular knowledge of the actual driver.

A definition of the primary functions of the interface that domain drivers support is set forth below:
  DrvDiscover ( ) Returns a list of the available authentication sources for this driver.
  DrvPint ( ) Contacts authentication server to determine server type and availability.

The domain manager can pass the name of an authentication source to the driver and the driver must determine if it can handle requests for the named authentication source.
  DrvLogon ( ) Issues authentication request to the server for logon
  DrvLogoff ( ) Issues commands to log the user off and trigger the management of local user account.
  DrvGetDomainType ( ) Change the user's password at the authentication source.
  DrvGetDomain Type ( ) Returns a symbolic name that the domain manager can use to reference this driver.
  DrvGetGroupsFor User ( ) Return a list of security groups that the user is a member of.

The DrvDiscover and DrvPing functions thus control discovery and discovery policy management. The DrvLogon function facilitates the dynamic creation of users. The DrvLogoff function is used to manage user accounts. The DrvGetDomainType function is also used to control discovery and administrator control of discovery policy. The DrvGetGroupsForUser function is used for dynamic creation of users. The Logon function is used to store and retrieve user profiles. Additional details about these functions are now described.

Discovery

AS noted above, the Primary Logon Client allows multiple authentication sources to be active at one time. Rather than require the user to know or remember the name of all authentication sources, the invention provides the capability of searching, or "discovering" the available authentication sources.

Since the domain manager preferably has no particular knowledge of any particular driver, it has no way of generating a list of available authentication sources. Instead, it calls the DrvDiscover ( ) function of each of the registered domain drivers. Each domain driver can then search for authentication sources that it knows about. The domain manager collects the responses from each of the domain drivers and presents a unified list of authentication sources to the user. The user does not have to know what type of authentication source any particular name represents. The domain manager routes the request to the appropriate driver.

The implementation of the DrvDiscover ( ) function varies according to the design of the authentication source. Examples of how the SMB and DCE domain drivers implement discovery follows:

SMB Domain Driver

First, the SMB domain driver tries to get a list of available SMB domains from the browser service running on the workstation. The browser service contacts a browser master to get a list of the domains that it knows about. The browser master continually monitors the network to determine what domains are available.

If the SMB domain driver is able to get a list from the browser, it returns that list to the domain manager. If not, the SMB domain driver will broadcast on the network to tell any servers that are up to respond. It then collects those responses and analyzes them to determine which are appropriate to return to the domain manager.

DCE Domain Driver

DCE does not provide way to "discover" DCE cells, so the driver just returns the name of the cell that the workstation is configured in. No network traffic is generated.

Of course, the above examples are merely exemplary. Thus, the implementation of the discover function varies from driver to driver, but the architecture allows the domain manager to present a unified list of authentication sources to the end-user.

The determination of authentication location type and storage is another feature of the discovery process. The unified list is cached and stored on the Windows NT client machine. The registry on the client machine is the storage location, and a location preferably exists for each type of authentication source. For a preferred Windows NT implementation, the location is:
HKEY_LOCAL_
MACHINE\System\CurrentControlSet\Services\IBM
NeTNT\DomainCache The discovery code thus is responsible for determining the type of authentication provider that was discovered. The method of determination differs for the different types of authentication providers. When the type is determined, the location will be placed in the section specific to that provider (e.g., NT, SMB, DCE). If the type cannot be determined form the discovery process, the location will be placed in the UNKNOWN section and the type will be determined during the actual authentication process. Once the type is determined, the entry will be removed from the UNKNOWN section and placed in the appropriate section based on the type.

Storage and retrieval of Windows user profiles from file systems other than native Windows NT is facilitated by the architecture described above. In particular, because each of the domain drivers may access different types of servers for authentication, there may be different methods and products used to save and read files on the server. Thus, the invention includes an appropriate driver function to allow access to file systems other than a standard Windows NT based file system.

More specifically, the user profiles are handled during the user logon (authentication) process. As part of the processing of the WlxLoggedOutSASO interface within the ibmgina module, the user profile location is determined and returned to the WinLogon module executing within the Windows NT client system. Based on the type of authentication target (SMB server domain, DCE Cell, NT Serer Domain, etc.) selected by the user, the appropriate domain driver is called to process each of the interface requests made to the ibmgina module. For handling of user profiles, the domain driver is responsible for returning the location of the user profile. The method required for determination of the location of the user profile will differ significantly based on the type of file system used to store the user profile. The WinLogon module requires the user profile to be in a location that can be accessed by standard file system code executing on the Windows NT client system. If the server implements a file system that is equivalent to the Windows NT base file system, then the steps required to return a path may be very simple. If the file system on the server differs from the Windows NT base file system, additional steps are typically required to support user profiles.

In the preferred embodiment of the invention, one of the authentication providers supported is an SMB server domain. A specific domain driver exists for SMB Domains. To support the storage and retrieval of the user profiles from SMB servers, the domain driver implements the DrvLogon ( ) interface. AS part of the DrvLogon processing within the domain driver, the user profile path is set in the WlxProfile location of the information returned from the WlxLoggedOutSAS( processing.

In the case of the SMB server, the user account on the local machine is accessed to determine if the user has "maintained" the account on the local machine. If the account is "maintained" and a user profile path has been entered for the user account, that path will be set in the WlxProfile location. If no path exists, then the SMB server will be accessed. File access commands will be executed to determine if a users profile exists. In the case of SMB servers, the user account on the server is accessed to determine if the user has created a directory on the server to hold information unique to the user (called home directory). If a home directory exists for the user, a path will be constructed to point to that location. Since a SMB server has a file system that is compatible with a standard Windows NT file system, the WlxProfile value will be set to the path that is constructed.

When the WinLogon process receives this WlxProfile value, the user profile held in that location will be downloaded (if required) to the local Windows NT system. The WinLogon process will then be responsible for using the information in the user profile to create the users desktop and set any other preferences specified in the file. The processing of the user profile is the standard client system processing on Windows NT.

Other file systems would handle the user profile processing within their domain drivers. A domain driver that used Distributed File Systems (DFS) as the file system on the server would be required to implement the same interface handling and provide a path to the WinLogon module within the WlxProfile value. When file systems differ from what standard Windows NT utilizes, the steps required to access the file and make it available to Windows NT will differ. Even though the steps may differ, the capability exists to utilize these file systems. This is a significant benefit since other important data may exist within those file systems and it may be desirable to hold the user profiles in this same file system.

Processing the WlxLogoff ( ) interface will cause the user profiles to be stored. Again, the domain driver is responsible for handling this processing through implementation of and a call to the DrvLogoff ( ) interface. The domain driver will set the WlxProfile location to be accessed and the driver will be responsible for turning that value into the appropriate location on the system (server) storing the profiles. The necessary file system commands will be used within the domain driver to store the files.

Administration of Control of Discovery Presenting Panels

Figure 13:
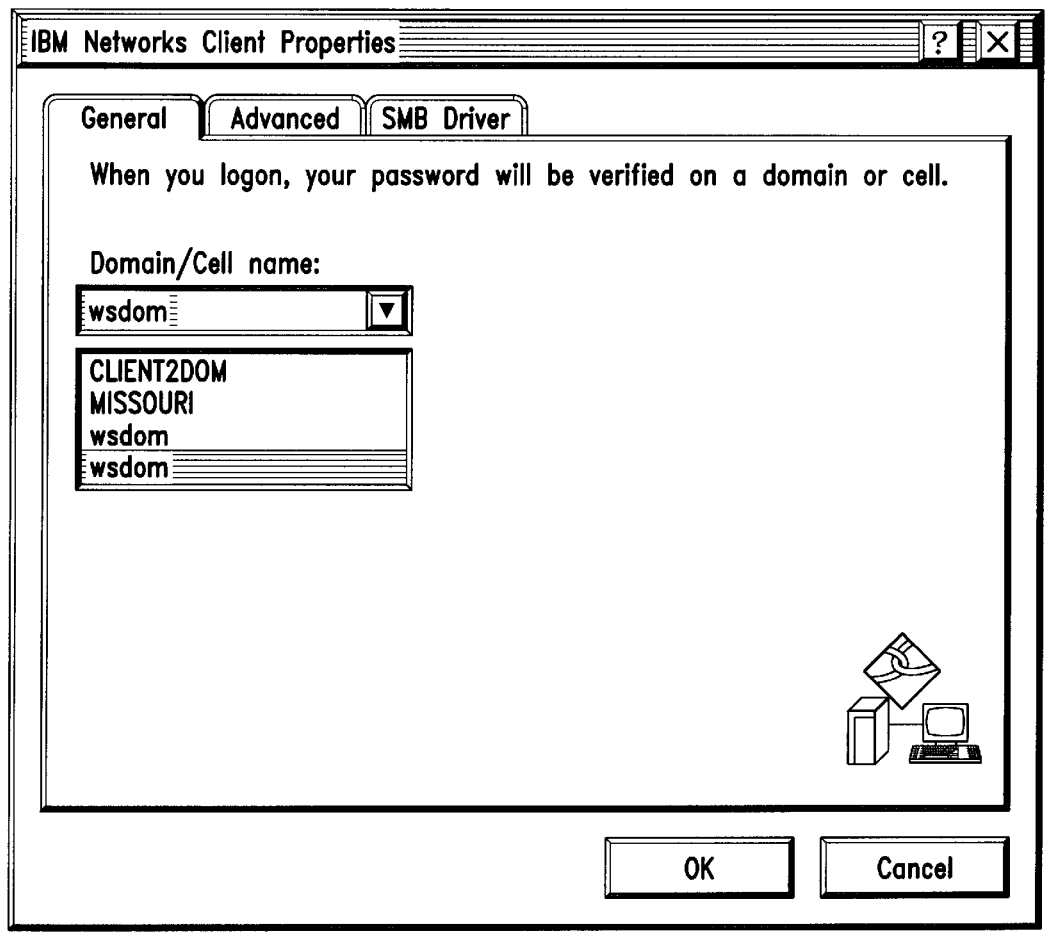
FIG. 13 is a representation of a General Properties display screen used to facilitate administrative management of discovery policy.
Figure 14:
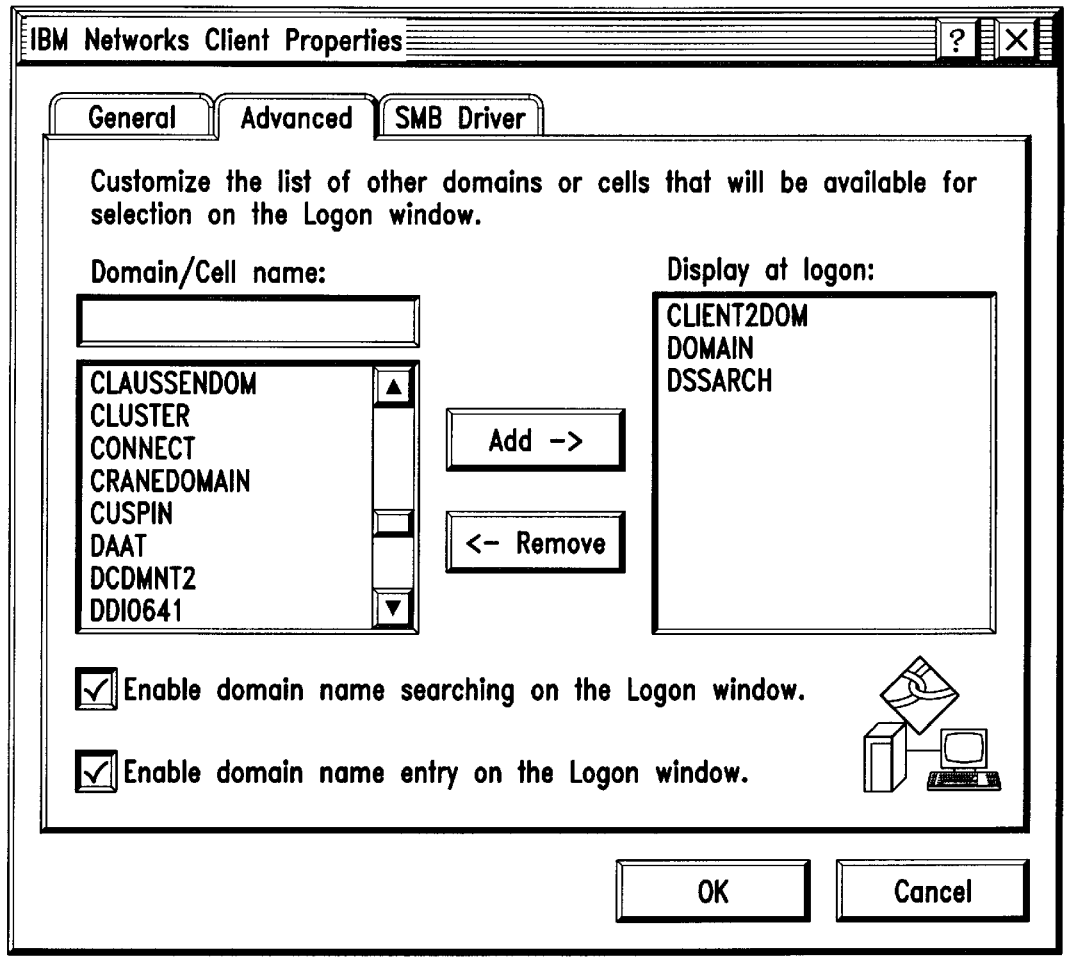
FIG. 14 is a representation of an Advanced Properties display screen used to facilitate administrative management of discovery policy.
Figure 15:
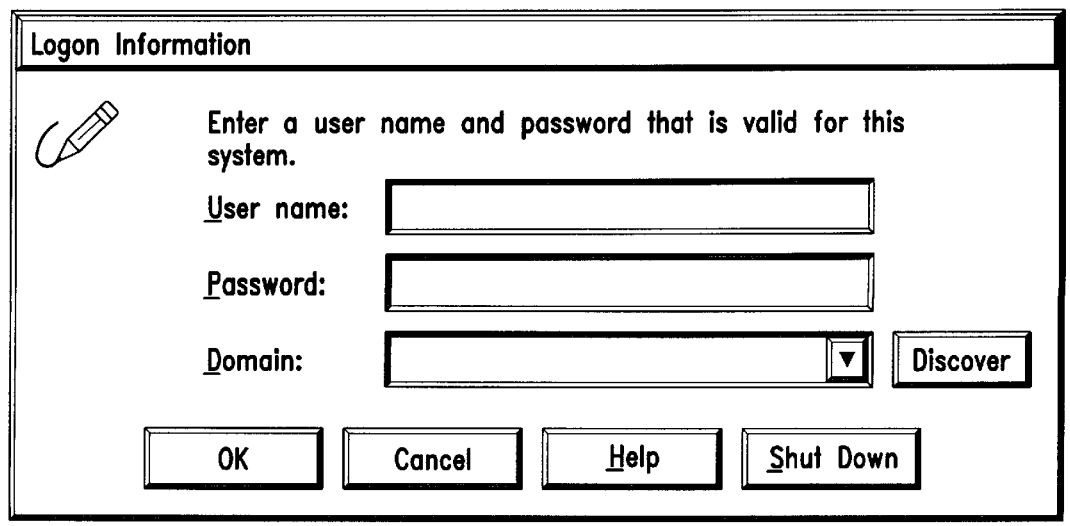
FIG. 15 is a representation of a Logon Panel display screen in accordance with the present invention.

Administration of the discovery process is controlled through a series of graphical pages, the General Properties page (FIG. 13), the Advanced Properties page (FIG. 14) and the Logon Panel (FIG. 15).

The first of these pages, the General Properties page, contains a drop-down combination box which dynamically fills in the name of located domains found on the network. When this page is opened, but before any information is displayed, all of the domains have made themselves known to the list. This drop-down combination box can now display a discovered list of domain names. A domain can be selected when the drop-list button is pressed. In addition, a domain name that was not in the list can be typed into the entry field. Any domain name typed or selected into the "Domain/Cell name" field will be displayed in the logon panel as the default authentication location.

The Advanced Properties page is divided into two listboxes. The first list, "Domain/Cell name," uses the same method of discovery as the "Domain/Cell name" combination box from the General Properties page and therefore displays the same list of discovered domains. The second listbox displays domains the administrator would like the user to view at logon. A "Domain/Cell name" entry field also exists in order to type in domain names that do not show up in the dynamically discovered list.

Presenting Discovered Locations

As previously mentioned, the discovered lists are generated by making a request to the local workstation's browser service of all of the domains that have made themselves known to the network. This dynamically generated list can be displayed from three locations: the General Properties page, the Advanced Properties page, and the Logon Panel. Since authentication locations are continually changing on a large network, the Logon Panel preferably has an added feature. When the "Discover" button on the Logon panel is clicked, the browser service on the local workstation is again queried for an updated list of available authentication locations.

Tailoring the Domain List for Logon

For added security, the administrator can customize the list of available authentication locations which the user is allowed to logon. In the Advanced Properties page, the administrator can select as few or as many of the domain names from the "Domain/Cell name" listbox. By clicking on an "Add" button, those selected domain names will be added to the "Display at logon" listbox. Furthermore, the administrator can type into the "Domain/Cell name" entry field any domain name not displayed in the listbox and add them to the "Display at logon" list. All domain names listed in the "Display at logon" listbox will then be available to the user at logon.

Caching Selected Domains/Cells

The administrator has further control of the logon client by means of a built-in domain cache. The administrator selects and adds domain names to the "Display at logon" list in the Advanced properties page. These domain names are then cached to a location in the registry of the local workstation. If the domain name is known to be of a NT domain type, the name is cached to the NT DomainCache location in the registry. If the domain is known to be of a LAN Server type, the name is cached to the SMB DomainCache location in the registry. If the type Of the domain is unknown, the name is cached to the UNKNOWN DomainCache location in the registry. When the Properties page is reopened by the administrator at some other point in time, all the domains listed in the three different DomainCache locations in the registry are loaded and displayed into the "Display at logon" listbox.

Updating the Logon Panel With or Without the Discovery Button

The administrator can extend security in the logon process by either allowing or disallowing the user the ability to discover authentication locations. A selection box in the Advanced Properties page enables or disables the "Discover" button on the logon panel. If the "Discovery" button is disabled, the user will only see domain names listed in the "Display at logon" listbox. If the "Discover" button is enabled, the user can click on this button during logon and retrieve all the domain names which have made themselves known to the local workstation.

Enabling/Disabling Domain Name Entry at Logon

To further limit the availability of different authentication locations to the user, the administrator can disable the appropriate selection box in the Advanced Properties page which normally allows the user to type in domain names in the entry field during logon. If this entry field is disabled, the user can only logon to domains listed in the "domain name" listbox in the logon panel.

Determine Type of Authentication Target

Given a domain name, the domain manager must determine its authentication type. Cached names are first examined to see if the domain has previously been identified. If the domain has not been identified, the domain manager queries each domain driver for ownership. If a domain driver claims ownership of the domain, the type is recorded in the cache. The domain name and driver are thus correlated in the cache.

Calling Correct Domain Driver

The domain manager, once ascertaining ownership of a domain, will pass requests (such as a request for user authentication) against that domain to the owning domain driver.

Issuing Authentication Calls

In the case of non-NT SMB domains, authentication is accomplished with the following:

Call NetUseAdd (a Win32 API) to connect to the IPC$ resource on the authenticating server. This call results in the following SMBs between the client and the server:

Negotiate Protocol—determine software levels of both machines.

Session Setup and Connect—validate the userid and password against those stored at the server.

If the server indicates success, the sequence continues as:

Call NetUserGetInfo (a Win32 API) to retrieve user information for extended validation of user logon hours and other elements. This call results in the following SMB between the client and the server:

Transact—generic RPC (remote procedure call) exchange.

Receive Success/Failure

A successful case would be indicated by result codes of 0 for both calls to the Win32 APIs above. A failure case might be sequences as:

```
Client --- NetUseAdd --> Server
Client <-- result code of 86 --- Server
```

Where "86" is interpreted to mean "the password is not valid" (i.e., does not match that stored at the server).

Determine If User Exists, Creation of User.

Following successful network authentication, a local account is created by means of the Win32 API NetUserAdd. The API may indicate that the account already exists.

Retrieving Group Info

The Win32 APIs NetUserGetGroups and NetUserGetLocalGroups are used to determine the group membership of the user account on the logon server and local machine, respectively. In the DCE login case, the DCE RPC Sec__login__get__groups is used to retrieve group membership from the cell. The Win32 API NetLocalGroupAdd is used to create a group on the local workstation.

Typing Group and User Together

When interfacing with a SMB domain, the list of groups for the user account is retrieved as noted above. Each group is then created locally as a representation of the domain group. The group name is noted as "domain__group" to indicate the domain that it was derived from. If the user account existed before the current authentication was performed, membership in any previous group is removed and replaced with the current set of domain groups. This is accomplished with the Win32 APIs NetLocalGroupAddMembers and NetLocalGroupDelMembers.

It should be appreciated by those skilled in the art that the specific embodiments disclosed above may be readily utilized as a basis for modifying or designing other techniques for carrying out the same purposes of the present invention. It should also be realized by those skilled in the art that such equivalent constructions do not depart from the spirit and scope of the invention as set forth in the appended claims.

What is claimed is:

1. A method of managing a user account at a client running a closed native operating system, the client normally configured against an account held at a server running the closed native operating system, comprising the steps of:

following authentication of a user against a non-native server domain, establishing a user account at the client in a format of the closed native operating system, thereby allowing the user to access resources accessible via the closed native operating system; and at a predetermined time, taking a predetermined action with respect to the user account, the predetermined action selected from the group of actions consisting of maintaining, disabling and deleting the user account.

2. The method as described in claim 1 wherein the non-native server domain is a Server Message Block (SMB) server domain.

3. The method as described in claim 1 wherein the non-native server domain is a DCE Cell.

4. The method as described in claim 1 wherein the predetermined time is logoff of the user from the client.

5. The method as described in claim 1 further including the step of associating a set of access rights to the user account.

6. A method of managing a closed operating system user account at a closed operating system client, comprising the steps of:

following authentication of a user against a non-native server domain, establishing a closed operating system user account at the client, thereby allowing the user to access resources accessible via the closed operating system;

maintaining the closed operating system user account as work is done at the client; and at user logoff, taking a predetermined action with respect to the user account, the predetermined action selected from the group of actions consisting of maintaining, disabling and deleting the closed operating system user account.

7. The method as described in claim 6 wherein the non-native server domain is a Server Message Block (SMB) server domain.

8. The method as described in claim 6 wherein the non-native server domain is a DCE Cell.

9. The method as described in claim 6 further including the step of associating a set of access rights to the user account.

10. A computer program product in a computer-readable medium for managing a user account at a client running a closed native operating system, the client normally configured against an account held at a server running the closed native operating system, comprising:

means responsive to authentication of a user against a non-native server domain for establishing a user account at the client in a format of the closed native operating system, thereby allowing the user to access resources accessible via the closed native operating system; and means initiated at a predetermined time for taking a predetermined action with respect to the user account.

11. The computer program product as described in claim 10 wherein the means for taking includes means for maintaining the user account at the client.

12. The computer program product as described in claim 10 wherein the means for taking includes means for disabling the user account at the client.

13. The computer program product as described in claim 10 wherein the means for taking includes means for deleting the user account from the client.

14. The computer program product as described in claim 10 further including means for associating a set of access rights to the user account.

15. The computer program product as described in claim 10 wherein the native operating system is closed and the non-native server domain is a server domain selected from the group of server domains consisting of Server Message Block (SMB) server domains and DCE Cells.

16. The computer program product as described in claim 10 wherein the predetermined time is user logoff.

17. A computer connectable to a network, comprising:

a processor;

a closed operating system;

means responsive to authentication of a user against a non-native server domain for establishing a user account at the client in a format of the closed operating system, thereby allowing the user to access resources accessible via the closed operating system; and means initiated at a predetermined time for taking a predetermined action with respect to the user account.

18. The computer as described in claim 17 wherein the means for taking includes means for maintaining the user account at the client.

19. The computer as described in claim 17 wherein the means for taking includes means for disabling the user account at the client.

20. The computer as described in claim 17 wherein the means for taking includes means for deleting the user account from the client.

21. The computer as described in claim 17 wherein the non-native server domain is a server domain selected from the group of server domains consisting of Server Message Block (SMB) server domains and DCE Cells.

* * * * *